W. O. KENNINGTON.
SYSTEM FOR SUPPLYING ELECTRICITY.
APPLICATION FILED MAY 21, 1914.
1,219,008.
Patented Mar. 13, 1917.
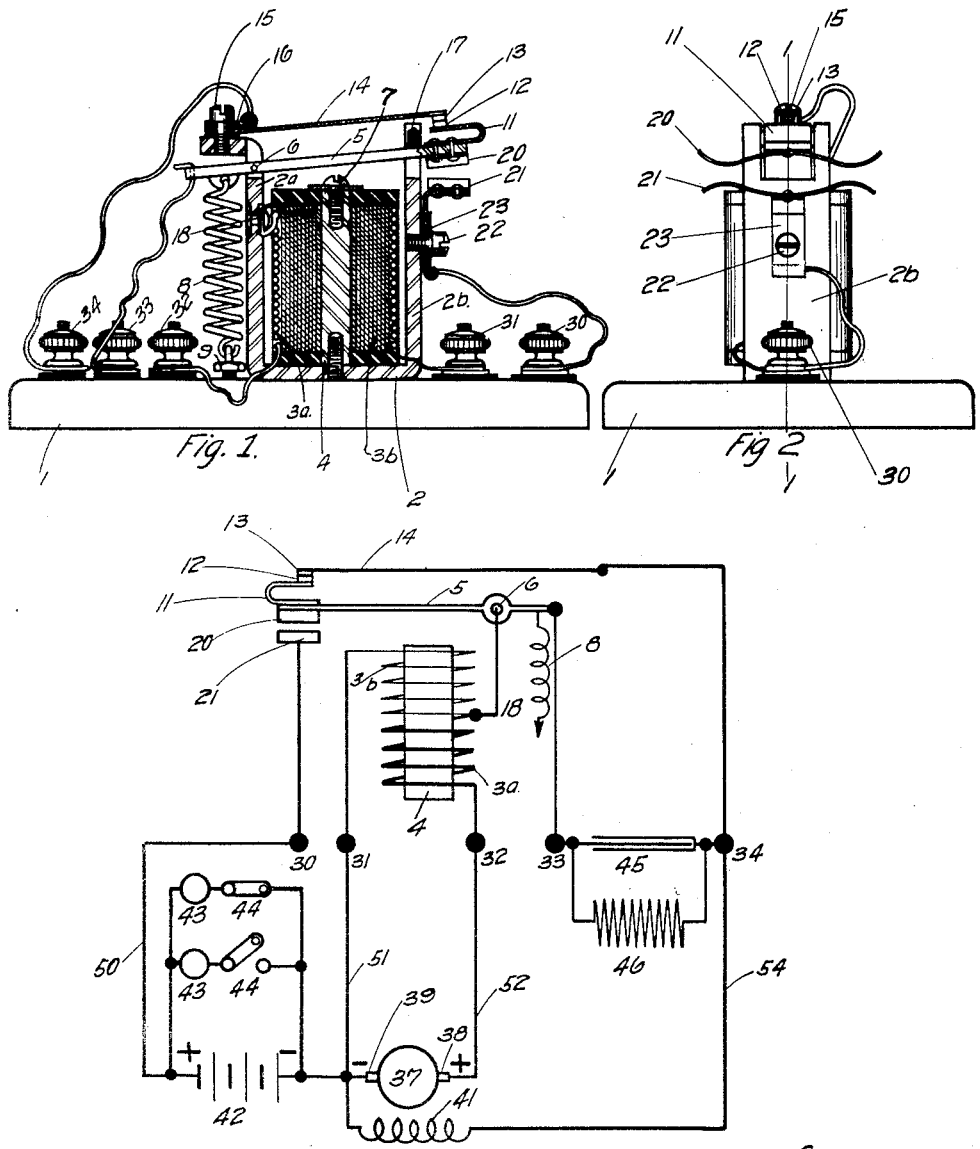

UNITED STATES PATENT OFFICE.

WILLIAM OSCAR KENNINGTON, OF ANDERSON, INDIANA, ASSIGNOR TO REMY ELECTRIC COMPANY, OF ANDERSON, INDIANA.

SYSTEM FOR SUPPLYING ELECTRICITY.

1,219,008.   Specification of Letters Patent.   Patented Mar. 13, 1917.

Application filed May 21, 1914. Serial No. 840,127.

*To all whom it may concern:*

Be it known that I, WILLIAM OSCAR KENNINGTON, a subject of the King of England, and a resident of Anderson, in the county of Madison and State of Indiana, (whose address is care of Remy Electric Company, of same place,) have invented a new and useful System for Supplying Electricity, of which the following is a specification.

My invention relates particularly to that class of electric supply systems, wherein the output of generator is automatically regulated by the opening and closing of contact points which are suitably associated with said generator, and wherein said generator is connected to, or disconnected from its load automatically, according to the condition of operation of said generator, by means of contacts suitably associated with the circuit of said generator.

The feature of my invention lies in the employment of a relay having a magnet responsive to the output of the source, which controls the contacts regulating the output of said source, and also those associated with the armature circuit.

I am aware that electric supply systems having separate relays for each of the above mentioned functions have been constructed, but I believe that I am the first to obtain both these results with a single relay for accomplishing both functions.

My invention has been made with special reference to electric supply systems wherein a generator is associated with some electrical device which may cause electrical power to be supplied to said generator armature, or in other words tends to cause said generator to become a motor. It is one function of my invention to disconnect said armature under such conditions. This conversion of the generator into a motor may occur, for example when the generator is used to supply storage batteries, or when the generator in question is connected in parallel with other generators.

Referring to the drawings:

Figure 1 is an elevation of the relay forming the principal feature of my invention. Shown chiefly in section along the line 1—1 of Fig. 2.

Fig. 2 is a view of the right hand end of Fig. 1.

Fig. 3 is a diagram of circuits showing the application of my invention to a shunt generator adapted to charge a storage battery.

Referring particularly to Figs. 1 and 2, the relay has a base 1 to which is secured a yoke 2 of magnetic material having upwardly extending arms $2^a$ and $2^b$. There is an electromagnet having a core 4 and two windings $3^a$ and $3^b$. $3^a$ is a coarse winding, having relatively few turns and low resistance, and $3^b$ is a fine winding having relatively many turns and high resistance. There is an armature, 5 for said electromagnet, pivoted to the arm $2^a$ of said yoke 2 by a pin, 6. A screw of non-magnetic material, 7, is shown inserted in the top of said core 4 to prevent contact of said armature and said core. There is a retractile spring 8, one end of which is connected to said armature 5, and the other end of which is connected to a suitable tension adjusting screw, 9, for regulating the action of said spring 8. Secured to the other end of said armature is a member 11, of conducting material, serving as a support for a contact point 12. There is a contact point, 13, adapted to be engaged by said contact 12. Said contact 13 is secured to one end of a flat spring 14. The other end of said flat spring 14 is secured to an extension of the arm $2^a$ of the aforesaid yoke, by a screw 15, but said spring and yoke are insulated from each other by means of suitable insulation, 16. The upper end of the arm $2^b$ of the aforesaid yoke is slotted so as to make room for the armature 5. Secured rigidly across the top of this slot is an insulating piece 17, which serves to limit the upward motion of the armature 5, and the downward motion of the spring 14. The flat spring 14 exerts a downward pressure so that contact 13 engages contact 12 until the armature 5 has moved so far downward that the spring 14 abuts the insulating piece 17.

There is also a contact spring 20, secured to said armature, which at certain times engages a stationary contact spring 21, said last named contact spring being secured to the arm $2^b$ of the yoke 2, by means of screw 22, but insulated therefrom by insulating material 23. The relay adjustment is such that when the relay armature 5 is in its uppermost or normal position, contacts 12 and 13 are in engagement, but contacts 20 and 21 are separated, but when it is at its lowest position, 12 and 13 are separated, and 20 and 21 are engaged. In accordance with common practice, 12 and 13 are designated as back contacts, and 20 and 21 as front contacts. At least one of said front contacts 20 and 21 is yielding, so that after their engagement the armature 5 may make an additional downward movement. Such additional downward movement requires a greater downward force to be exerted on the armature than the preceding downward movement, since said additional movement is resisted not only by the spring 8, but also by the front contacts 20 and 21. As the armature 5 moves downward, the front contacts engage before the back contacts separate, and as it moves upward, the back contacts engage before the front contacts separate. Thus the positions of the armature wherein the front contacts are closed, overlaps the positions wherein the back contacts are closed. This relation will hereinafter be referred to by saying that the two sets of contacts have overlapping closed positions.

There are five binding posts secured to the base 1, designated 30, 31, 32, 33 and 34 respectively, and electrically connected with the various parts of the relay as follows: 30 is connected to the front contact 21, 31 and 32 to the windings $3^b$ and $3^a$, respectively, 33 to the armature 5 and thereby to the contacts 12 and 20, and 34 to the spring 14 and thereby to the contact 13. The remaining ends of the windings $3^a$ and $3^b$ are grounded to the frame at 18.

Referring now particularly to Fig. 3, there is a direct current generator having an armature 37 and brushes 38 and 39, and field winding 41. There is a storage battery 42 supplying current consuming devices 43, 43 which are controlled by switches 44, 44. There is preferably a condenser 45, and a non-inductive resistance 46 connected in parallel across the binding posts 33 and 34 of the relay. One terminal of the storage battery is connected by the wire 50 to the binding post 30, and the other terminal of said storage battery is connected by wire 51 to binding post 31 of the relay. Said wire 51 is also connected to brush 39 and to one end of the field winding 41. Brush 38 is connected by wire 52 to binding post 32. The remaining end of the field winding is connected to post 34 by wire 54. The circuit which includes the generator armature, the storage battery and associated load, I term the main circuit of the generator.

The operation of this system is as follows:

When the generator is at rest, the action of the spring 8 holds the relay armature 5 in its uppermost or normal position, so that the front, or main contacts 20 and 21 are open, and the back or regulating contacts 12 and 13 are closed. The storage battery supplies current to such of the current consuming devices 43, 43 as are turned on.

Assume that the generator be started. Due to the engagement of contacts 12 and 13, there is a connection of relatively low resistance between the positive brush 38 and the wire 54 as follows, from brush 38, through wire 52, binding post 32, coarse winding $3^a$, relay armature 5, member 11, contacts 12 and 13, spring 14 and binding post 34 to wire 54. Since one end is connected to brush 39, the field winding is connected across the two brushes, and the generator acts as a shunt generator, and starts to generate in the well known manner. There is also a path for the current generated in the armature from brush 38 through wire 52, binding post 32, and coarse winding $3^a$, fine winding $3^b$, binding post 31, and wire 51 to brush 39, and as soon as the E. M. F. of the generator reaches a suitable value, this current magnetizes the core 4 sufficiently to cause it to attract the armature 5 and cause engagement of the front contacts 20 and 21. This establishes a connection between the positive brush 38 of the generator and the positive terminal of the storage battery as follows: from brush 38 through wire 52, binding post 32, coarse relay winding $3^a$, relay armature 5, contacts 20 and 21, binding post 30 and wire 50 to the positive terminal of the battery 42. The respective terminals of the storage battery are now connected to the respective brushes, and the generator furnishes energy to the storage battery and the load associated therewith. The above mentioned path from the positive brush 38 to the positive terminal of the storage battery together with the path from the negative terminal of said battery to brush 39 forms the main circuit of the generator.

The movement of the relay armature from its uppermost position to the position wherein the front contacts first engage is resisted only by the spring 8. Due to the overlapping closed position of the front and back contacts, the back contacts 12 and 13 are not opened during this movement. During further downward movement of the relay armature 5, the front contacts 20 and 21 must be bent, and therefore such portion of the downward movement is made not only against the action of the spring 8, but also against the action of the contact springs 20 and 21. Thus the initial movement of the relay armature may be sufficient to close the main circuit, and yet be insufficient to separate the back contacts.

When the output of the generator reaches such a value that the ampere turns due to the combined action of the windings $3^a$ and $3^b$ are sufficient to cause further downward movement of the armature, the back or field contacts 12 and 13 are separated, so that the path through the relay between binding posts 33 and 34 is interrupted, and the current which passes through the field winding is reduced, due to its being obliged to traverse the resistance 46 in its passage from binding post 33 to 34. This weakens the field and reduces the output of the generator. Depending on the proportions of the various parts of the circuit, the relay magnet may still be strong enough, even with the reduced generator output, to hold the relay armature in this position, or it may become weakened to such an extent as to release the armature, and permit the field to become strengthened again. If the former condition prevails, the relay will remain at rest with its back contacts open, at least until other conditions of operation produce a change in its action, but if the latter condition prevails, the relay armature will move up and down continuously and will keep the generator output at some value between that occurring when the back or field contacts are continuously open and that occurring when they are continuously closed.

Assume now that the generator speed be reduced. At a certain speed its output will be too low to separate the back contacts against the combined force of the spring 8 and the front contacts 20 and 21, but will hold the front contacts in engagement. The shunt field then being connected across the brushes with practically no resistance in series therewith, the generator output will be the same as that if no regulator were employed.

If now the speed be further reduced, or the generator entirely stopped, the reduction or absence of generated voltage will permit the storage battery 42 to discharge through the generator armature, and the winding 3ª. This winding will then oppose the winding 3ᵇ, causing the magnetism in the core 4 to become so weak that the armature 5 will be released, thereby separating the front contacts 20 and 21 and preventing a flow of power from the battery to the generator. This action is similar to that occurring in the well known reverse power relay used in connection with generators used for charging storage batteries.

The ampere turns acting on the relay core 4 are the total of the ampere turns due to the windings 3ª and 3ᵇ. Since the drop in winding 3ª is small, due to the low resistance of this winding, the winding 3ᵇ receives a voltage substantially equal to the generated voltage, so that its ampere turns are substantially proportional to the voltage at the generator terminals. The winding 3ª is traversed by the total current output of the armature and hence its ampere turns are proportional to the current output of the armature. Since the current supplied to the field winding 41 and relay winding 3ᵇ is, ordinarily, small compared with that supplied to the main circuit, it may be assumed that the ampere turns due to the winding 3ª are proportional to the current in the main circuit.

The higher the voltage across the brushes and therefore the greater the pull due to the winding 3ᵇ, the less will be the current required in winding 3ª, to open the field contacts. Thus this arrangement tends to give decreasing current as the voltage increases, which is particularly desirable for charging storage batteries. The particular manner in which the relay is responsive to the generator output, that is the relation between the voltage and current output resulting from the action of the regulator may be varied by changes in the proportion of the apparatus.

In the foregoing description, I have shown but one form of the embodiment of my invention, but many modifications therefrom may be made without departing from the spirit of the invention, and accordingly I do not limit myself to the specific form shown herein.

Among such modifications I may mention the excitation of the generator field by other than a shunt winding: the more or less indirect control of the various circuits controlled by the herein described relay, the use of other types of sources of electric energy, and other types of apparatus connected thereto than those herein shown, and other modifications that will be evident to one skilled in the art.

I claim as my invention:

1. In a system for supplying electricity, the combination with a generator, a field circuit for said generator and an armature circuit for said generator, of a relay having a magnet responsive to the output of said generator, and an armature controlling field contacts and main contacts, said field contacts being associated with said field circuit so as to reduce the excitation of said generator when its output exceeds a predetermined value, and said main contacts being associated with said main circuit so as to close said main circuit when the voltage of said generator exceeds a pre-determined value, and so as to open said main circuit when electrical power is supplied to said generator, and means yieldably opposing further closing movement of said main contacts after initial contact.

2. A system for supplying electricity including a relay having in combination, an electromagnet, an armature for said electromagnet, a back contact associated with said armature, a coöperating back contact associated with some part other than said armature, a front contact associated with said armature, and a coöperating front contact associated with some part other than said armature, at least one front contact and one back contact being yieldingly connected to that portion of the relay with which it is associated.

3. A system for supplying electricity including a relay having in combination, an electromagnet and an armature therefor, a spring acting on said armature throughout its whole range of movement, a front and a back contact associated with said armature, a front and a back contact associated with some other part than said armature, at least one of said front contacts being yielding, so as to permit further movement of said armature toward said electromagnet after the engagement of said front contacts, but so as to require greater force to produce said movement than is required previous to the engagement of said front contacts.

4. In a system for supplying electricity, the combination with a generator, a field circuit and an armature circuit for said generator, contacts for said circuits, of a relay having a magnet responsive to the output of said generator, an armature controlling the field and main circuits, and a resistance between said armature and said field circuit independent of said contacts, said armature adapted to separate said field contacts when the output of the generator exceeds a predetermined value, whereby the current will flow through said resistance to the field circuit, and said armature adapted to close said main contacts to close the main circuit when the voltage of said generator exceeds a predetermined value, and to separate said main contacts to open the main circuit when electrical power is supplied to said generator.

5. A system for supplying electricity, including the combination with a generator and a main circuit, and a field circuit for said generator, of a relay having an armature controlling front and back contacts controlling said circuits, said front and back contacts having overlapping closed positions, and means for limiting the movement of one of said contacts in one direction of closing movement to separate the same from its coöperating contact.

6. A system for supplying electricity including the combination with a generator and a main circuit, and a field circuit for said generator, of a relay having an armature controlling sets of contacts controlling said circuits, said sets of contacts having overlapping closed positions, and means for closing either set of contacts independently of the other set.

Signed at Anderson, county of Madison, and State of Indiana, this eighth day of May, 1914.

WILLIAM OSCAR KENNINGTON.

Witnesses:
   JNO. S. MILTON,
   F. P. McDERMOTT, Jr.